Oct. 14, 1969   A. L. B. SATTERLEE   3,472,473
AIRCRAFT ESCAPE
Filed Feb. 1, 1967   4 Sheets-Sheet 1
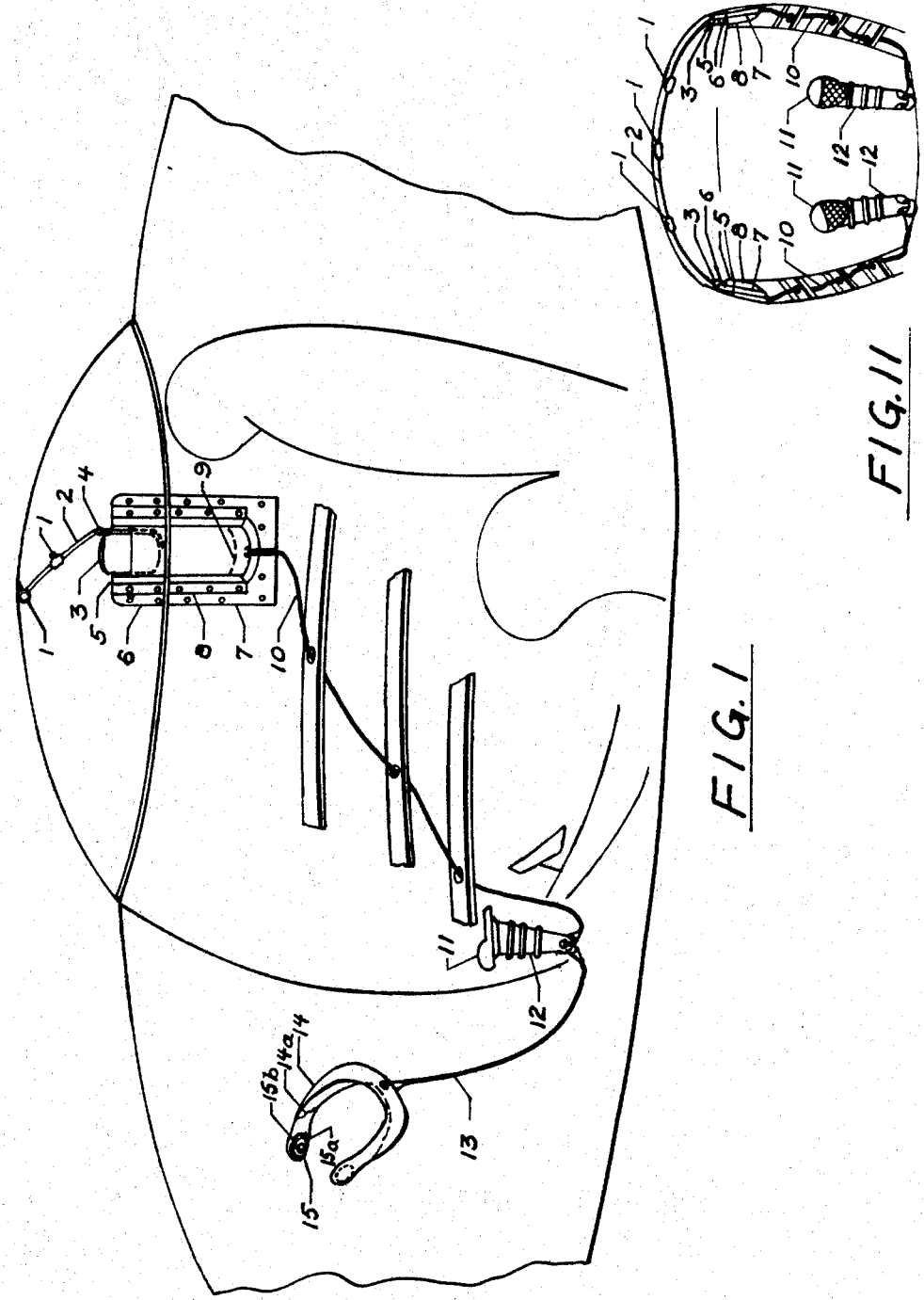
Anna Lucile Ballay Satterlee
INVENTOR Oct. 14, 1969     A. L. B. SATTERLEE     3,472,473

AIRCRAFT ESCAPE

Filed Feb. 1, 1967     4 Sheets-Sheet 2

Anna Lucile Ballay Satterlee
INVENTOR

Oct. 14, 1969     A. L. B. SATTERLEE     3,472,473
AIRCRAFT ESCAPE

Filed Feb. 1, 1967     4 Sheets-Sheet 4

Anna Lucile Bailey Satterlee
INVENTOR

United States Patent Office 3,472,473
Patented Oct. 14, 1969

3,472,473
AIRCRAFT ESCAPE
Anna Lucile Ballay Satterlee, 4746 Nicolet Ave.,
Fremont, Calif. 94536
Filed Feb. 1, 1967, Ser. No. 613,973
Int. Cl. B64c 1/32; B64d 25/08
U.S. Cl. 244—121                                2 Claims

ABSTRACT OF THE DISCLOSURE

A mechanical device that uses manual, electrical and magnetic power to dispel a canopy, enclosure cover plate or remove this retaining item, from the aircraft or vehicle in operation. This also has a safety feature to prevent the untimely removal of the before mentioned canopy.

A device that will hold the operation of the mechanism in abeyance until such time as it becomes necessary to put it into operation, by bringing the manual, electrical and magnetic forces necessary into play. The upper overhead and upper side cockpit device will drop upon manual command into the lower holder or force slot, to be forced back out by magnetic means, but this lower slot is connected to the triggering device also known as a safety device within the cockpit, which is also connected forward and uses the power from the generator and power pack. The electricity is drained off the generator, etc. by the most simplified of means withdrawing it and passing it along connectors and in a backward and upward movement to the force slot to remove canopy and allow the operator to disembark.

At the present time the method of most common use, is to open the canopy by a manual method of either lifting up, overhead or sliding back the canopy, so that the pilot may be ejected. However, there are some methods devised, that will blow a man and ejection seat, through the overhead canopy. However, if he doesn't have his crash helmet on, or for some reason, is not properly in the seat, this could result in injuries. None of these before mentioned methods, are in any way related to this invention. From my research it has not been possible to find anything that in any way, remotely resembles this method of easy releasing of the canopy, allowing the pilot, to take his leave by the conventional method. This invention is designed with the thought in mind the pilot may escape with or without his helmet receiving little or not injury.

This is designed primarily for aircraft, but with some modifications, could be used for space or other vehicles or modes of travel.

This escape mechanism is designed with the thought in mind; the pilot must ditch his disabled aircraft. He is trapped, inside the cockpit, because of failure of the mechanism to slide back or remove the canopy. Perhaps because of mechanical failure or under conditions of warfare, may have some foreign obstruction, preventing his removing the canopy, possibly a bullet or fragment of shell, or a bent metal track. Once the pilot fully realizes, he is unable to escape, he will automatically begin to strike out and lash about with this hands and feet in an effort to escape. This is when, I believe, this invention will be of service to him. It is essential, that for reasons of present equipment and economy of space this invention be made simply and easily as possible, to be installed in existing aircraft.

Accordingly it is one of the objects of this invention to provide a simplified way of escape, installed quickly on existing aircraft, in a minimum of space, not in use at the present time, by anyone familiar with aircraft installations. As it is a universal invention, neither right or left handed, it would need only one installation and an occasional recheck for maintenance for cleaniness, providing it has not been used, in error, when the plane was on the ground.

Because of the instruments in the cockpit, there must be a shield for the protection of them without the loss of the idea of this invention, which would provide a method of escape but also will hold in abeyance, the repellers until such time as their use, is immediately necessary.

Although, this is primarily designed with the idea it would be placed upon the top of the aircraft, within the cockpit and canopy, were it adapted to other uses, could be placed in any of several positions, whatever was needed, for the particular placement of the need, in question.

As in military aircraft, on the line, the airplane or aircraft, would of necessity, have to be operated, by a number of pilots, so this invention would of course be installed, in a manner to facilitate the use of it, by any pilot, regardless of their height or general build, used in an efficient manner, with a minimum loss of life, due to entrapment of pilots, unable to free-themselves quickly, because of the inability to lift the canopy, due to unforseen forces. This must be placed inside the plane in a manner to operate efficiently, to remove the canopy, in an up, out and backward movement, allowing for the free passage of the occupant, who is inside the cockpit, to the atmosphere.

As the name implies, the canopy ripoff remover is intended to release and effect the removal of the piece of equipment concerned, and allow for the easy escape of the pilot.

Other features and advantages of the invention will become more apparent by reference to the following description taken in conjunction with the accompanying drawings, wherein:

FIG. 1 shows the invention, or complete installation on the right side of the aircraft installed; however, it should be clearly understood that certain modifications will have to be made, providing the generator unit is not installed, on the rear of the engine but sometimes are on the front, side or other places.

FIGS. 2, 3, 4 show the individual mechanisms and by placing FIG. 2 at a left angle to FIG. 3 and FIG. 3 below and to the left of FIG. 4, show the entire drawings of the mechanism in an enlarged form. FIG. 5 is for showing the individual parts, placed on the same figure to facilitate the viewing of them. It is clearly understood that the connectors will of necessity for viewing, not be as long or short as the strategic placing of these may be required by individual installation. Owing to the many types of aircraft, etc., and varied designs, as well as the placing of each individual power supplying unit, it must be clearly understood by all, there will be a number of modifications and adaptations to each individual model of craft, because this invention, will be an addition to, the basic equipment, presently installed on such craft, in operation and for future installation, on all new craft. These modifications and adaptations are to be clearly understood, do not depart from the original intent of this invention. By placing FIGS. 2, 3 and 4 in the proper manner you can see the operation of this design.

FIGURES 5, 6 and 7 are cross-sectional views of FIGURE 2 showing elements 13, 14, 14a, 14b, 14c, 15, 15a and 15b.

FIGURE 11 is a view showing the structure installed in an aircraft.

It will be apparent upon examination that the overhead placing of the connector 2 upon the canopy will be in such a way, as to not obstruct the pilot's vision. It may of necessity require slight variations in placement on different canopies but will not depart from the original intent of the invention.

Figure 4:
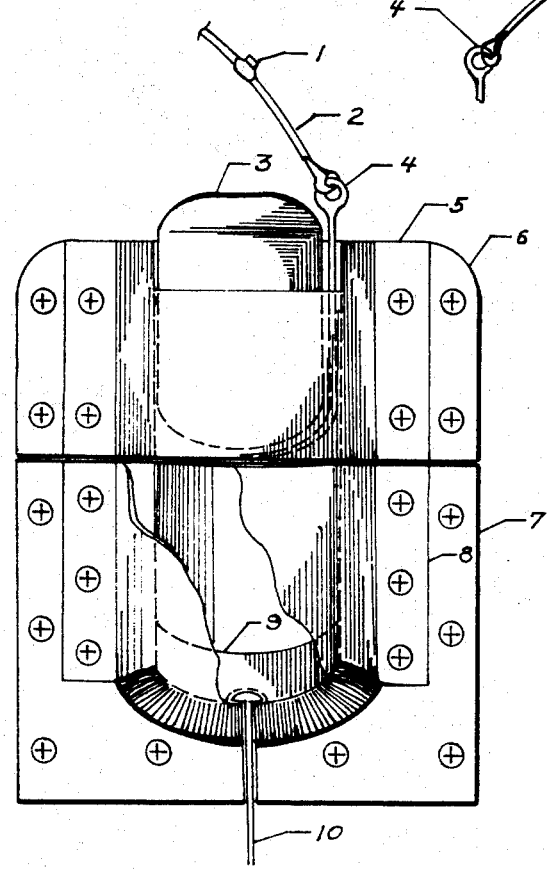
Figure 9:
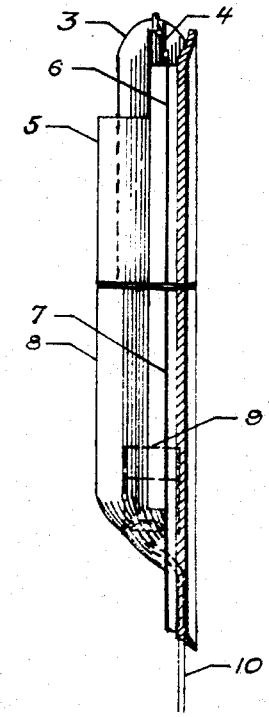
FIGURE 9 is a side view of the structure shown in FIGURE 4.

Flexible cable 2 is held in position on the inside of the aircraft by holder means 1. The cable is installed within reach of the pilot but outside of his field of vision. Each end of cable 2 is connected to a spring device 4 which maintains repeller means 3 as shown in FIGURE 4 in the upper position in slots, provided by guide means 5 and 6. Repeller means 9 is disposed at the bottom of guides 5 and 6. The guides are made of non-conducting non-magnetic material.

As shown in FIGURE 11, cable 2 extends to either side of the pilot where it is connected to a repeller means 3. When cable 2 is pulled by the pilot, spring device 4 releases repeller means 3 which descends toward repeller means 9. The magnetic fields of the repeller means react to eject repeller means 3 from guides 5 and 6. Repeller means 3 has its upper edge contoured to penetrate the canopy. After the canopy has been penetrated, the jet stream will force it away from the aircraft.

Figure 5:
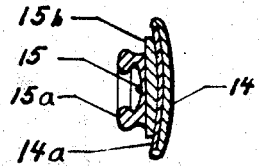
Figure 2:
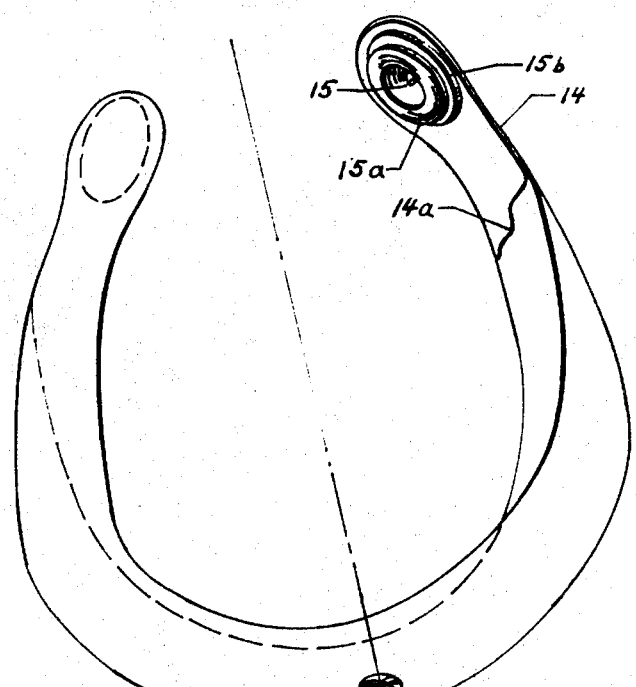
Figure 6:
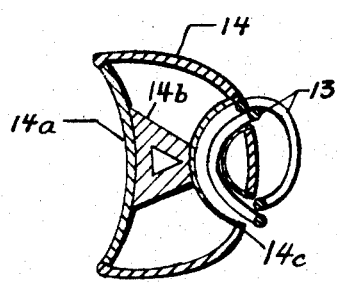
Figure 7:
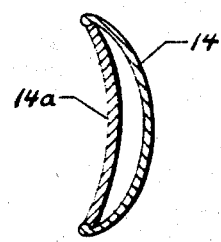
Figure 3:
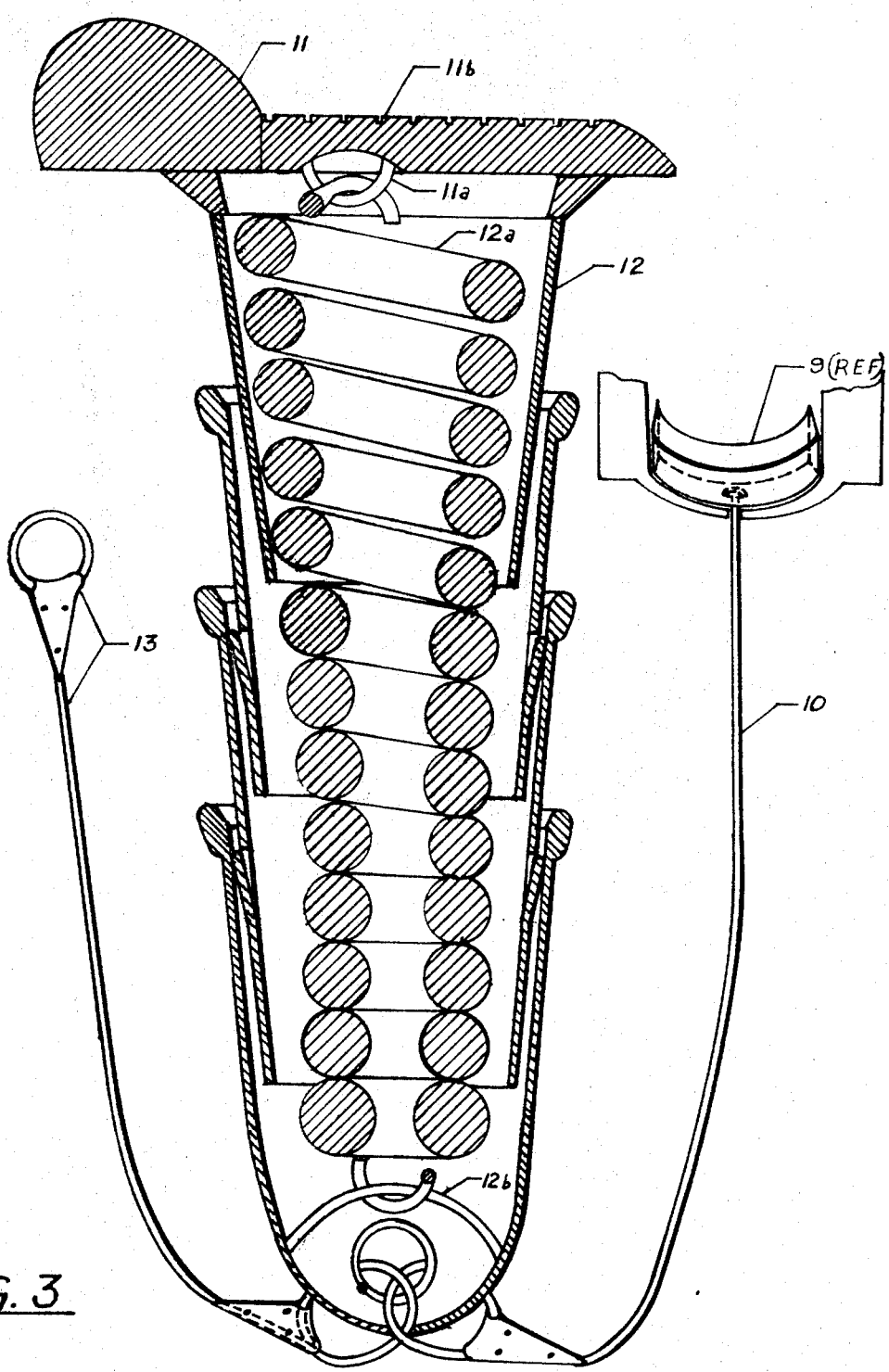
Figure 8:
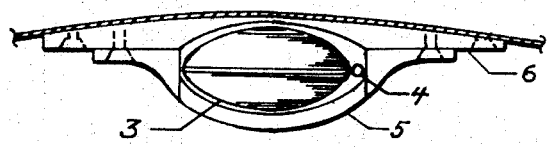
FIGURE 8 is a top view of the structure shown in FIGURE 4.
Figure 10:
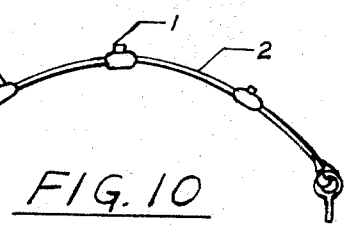
FIGURE 10 shows manual means.

As shown in FIGURE 11, there is a trigger 11 provided at each side of the cockpit of the aircraft enabling additional boosting power to be supplied to repeller 9. The triggers may be placed on the main floor of the aircraft in front of the brake pedals or on the lower part of the firewall below the instrument panel. As shown in FIGURE 3, triggers 11 are comprised of a gridded foot pad 11b having a safety button as shown. Pad 11, 11b is mounted on sliding unit 12 in which spring 12a is disposed. The lowermost part of sliding unit 12 is connected to two wires 13 connected at their ends to withdrawer 14, 14a carrying snapper collar cap 15a, 15b having contact 15. Cap 15a, 15b cooperates with an electrical generator so that when wires 13 are pulled, the electrical current output is connected to wires 13.

The lowermost part of sliding unit 12 is also connected to connector conductor 10 comprised of two wires adapted to conduct electricity from wires 13 to repeller 9 which may be an electromagnet. Thus when the pilot pushes pad 11b down with his foot, wires 13 are pulled to connect them by cap 15a, 15b to the generator to receive electricity. The electrical current conducted by wires 13 passes along wires 10 to energize repeller 9.

In operation, when the pilot wishes to eject from the aircraft, he pulls cable 2 to move spring device 4 permitting repeller means 3 to descend along guide means 5. The reaction of the magnetic fields of repeller means 3 and 9 causes repeller means 3 to eject from the guide means and penetrate the canopy. Thereafter the natural force of the jet stream will remove the canopy from the aircraft.

In the event a larger force should be applied to repeller means 3, the pilot after pulling cable 2 places his foot on a pad 11, 11b pressing it down. This movement pulls wires 13 to connect them to the output of an electrical generator on the aircraft. The electricity is conducted by wires 10 and 13 to energize repeller means 9, the field of which cooperates with the field of repeller means 3 to eject repeller means 3.

What is claimed is:

1. In an auxiliary escape mechanism for an aircraft with canopy over a cockpit, comprising upper and lower repeller means secured in a spaced relationship to each other, said upper and lower repeller means being of opposing magnetic fields, said upper repeller means having a contoured edge, the contoured edge of the upper repeller means being provided with a configuration which enables the said upper repeller means to penetrate the canopy, an actuator means for releasing upper repeller means into contact with the lower repeller means within an accompanying force field, said fields acting to force said upper repeller means upward to penetrate the canopy, thus creating the effective ejection of canopy by force of jet stream coming in contact with the hole caused by upper repeller means.

2. An auxiliary escape mechanism as described in claim 1 with the addition of means for providing additional and more powerful driving force to instigate the operation of said repeller means, comprising means for accepting power from a power source within the aircraft, actuator means, conductor means connecting the power accepting means to the actuator and the actuator to the lower repeller means, the additional power means thereby providing an electro-magnetic force field greater than the natural force field between the upper and lower repellers.

References Cited

UNITED STATES PATENTS

| | | | |
|---|---|---|---|
| 2,820,602 | 1/1958 | Foster | 244—121 |
| 2,832,553 | 4/1958 | Wallenhorst | 244—121 |
| 2,998,212 | 8/1961 | Rogers | 244—121 |

MILTON BUCHLER, Primary Examiner

THOMAS W. BUCKMAN, Assistant Examiner